(12) United States Patent
Fiedler (10) Patent No.: US 9,722,476 B2
(45) Date of Patent: Aug. 1, 2017

(54) SELF-CENTERING ELECTROMAGNETIC TRANSDUCERS

(71) Applicant: L-3 Communications Cincinnati Electronics Corporation, Mason, OH (US)

(72) Inventor: Andreas Fiedler, Pasadena, CA (US)

(73) Assignee: L-3 Communications Cincinnati Electronics Corporation, Mason, OH (US)

(*) Notice: Subject to any disclaimer, the term of this patent is extended or adjusted under 35 U.S.C. 154(b) by 434 days.

(21) Appl. No.: 14/245,554

(22) Filed: Apr. 4, 2014

(65) Prior Publication Data
US 2014/0300213 A1 Oct. 9, 2014

Related U.S. Application Data

(60) Provisional application No. 61/808,482, filed on Apr. 4, 2013.

(51) Int. Cl.
*H02K 41/02* (2006.01)
*H02K 33/16* (2006.01)
*H02K 35/02* (2006.01)

(52) U.S. Cl.
CPC ............. *H02K 33/16* (2013.01); *H02K 35/02* (2013.01)

(58) Field of Classification Search
CPC ..................................... H02K 33/16
USPC ....................... 310/12.24, 25, 30, 36, 37, 38
See application file for complete search history.

(56) References Cited

U.S. PATENT DOCUMENTS

| | | | |
|---|---|---|---|
| 4,090,745 A | 5/1978 | Dohogne et al. |
| 4,363,980 A | 12/1982 | Petersen |
| 4,381,875 A | 5/1983 | Studer |
| 4,600,910 A | 7/1986 | Vanderlaan |
| 4,675,563 A | 6/1987 | Goldowsky |
| 4,697,113 A | 9/1987 | Young |
| 4,827,163 A | 5/1989 | Bhate et al. |
| 4,937,481 A | 6/1990 | Vitale |
| 5,148,066 A | 9/1992 | Beale et al. |

(Continued)

OTHER PUBLICATIONS

International Search Report and Written Opinion issued in corresponding PCT Appln. No. PCT/US2014/033020, mailed Aug. 19, 2014.

*Primary Examiner* — Hanh Nguyen
(74) *Attorney, Agent, or Firm* — Dinsmore & Shohl LLP (57) ABSTRACT

Self-centering electromagnetic transducers, such as linear motors and generators, are disclosed. In one embodiment, an electromagnetic transducer includes an outer yoke made of a ferromagnetic material, and a coil assembly including a plurality of loops of electrically conductive wire, wherein the coil assembly is substantially surrounded by the outer yoke. The electromagnetic transducer further includes a magnet, and an inner yoke made of ferromagnetic material. The magnet is disposed within the outer yoke such that the coil assembly surrounds the magnet. The inner yoke is disposed within the magnet, and the magnet is free to translate. The electromagnetic transducer further includes at least one high-reluctance zone positioned within the outer yoke and/or the inner yoke. In some embodiments, the electromagnetic transducer includes one or more actuators that vary a width of one or more high-reluctance zones to change a spring rate of the electromagnetic transducer.

19 Claims, 13 Drawing Sheets

(56) References Cited

U.S. PATENT DOCUMENTS

| | | |
|---|---|---|
| 5,175,457 A | 12/1992 | Vincent |
| 5,220,223 A | 6/1993 | Mehnert |
| 5,347,186 A | 9/1994 | Konotchick |
| 5,446,382 A | 8/1995 | Flora |
| 5,654,596 A | 8/1997 | Nasar et al. |
| 5,693,991 A | 12/1997 | Hiterer et al. |
| 5,907,201 A | 5/1999 | Hiterer et al. |
| 5,973,422 A | 10/1999 | Clamme |
| 6,009,615 A | 1/2000 | McKean et al. |
| 6,483,207 B1 | 11/2002 | Redlich |
| 6,667,677 B2 * | 12/2003 | Yajima .................. H01F 7/081 335/220 |
| 6,914,351 B2 | 7/2005 | Chertok |
| 6,919,659 B2 | 7/2005 | Rapp |
| 6,946,765 B2 | 9/2005 | Rapp et al. |
| 7,242,118 B2 | 7/2007 | Sakamoto |
| 7,859,144 B1 | 12/2010 | Sahyoun |
| 8,310,113 B2 | 11/2012 | Unger |
| 2004/0012270 A1 * | 1/2004 | Kwon .................. H02K 33/16 310/15 |
| 2008/0197720 A1 | 8/2008 | Matsumoto et al. |
| 2008/0203829 A1 | 8/2008 | Matsumoto et al. |
| 2011/0068884 A1 | 3/2011 | Brooks |
| 2012/0207628 A1 | 8/2012 | Al Otaibi |

* cited by examiner

SELF-CENTERING ELECTROMAGNETIC TRANSDUCERS

CROSS-REFERENCE TO RELATED APPLICATIONS

This application claims the benefit of U.S. Provisional Application No. 61/808,482, filed Apr. 4, 2013.

BACKGROUND

Field

The present specification generally relates to electromagnetic transducers and, more particularly, electromagnetic transducers having a self-centering characteristic in an axial direction.

Technical Background

Electromagnetic transducers may include linear motors and linear generators, for example. A linear motor converts alternating current applied to a coil into linear translation of a magnet or coil, while a linear generator converts linear translation of a magnet into alternating current in a coil. Conventional linear electromagnetic transducers of these types incorporate return springs to prevent the magnet from escaping the gap in which it is disposed, as well as to define the neutral position for the reciprocating oscillation movement of the magnet or coil. However, use of springs in the electromagnetic transducer is costly, and may lead to a large and heavy device. Further, such return springs cause lateral forces on the bearing of the transducer, which may limit the lifetime of the device. Additionally, it may be difficult and unpractical to change the spring rate of an installed return spring, especially during operation. As such, electromagnetic transducers incorporating return springs have a static spring rate.

Accordingly, a need exists for alternative linear electromagnetic transducers that have a self-centering magnet without the need for return springs.

SUMMARY

In one embodiment, an electromagnetic transducer includes an outer yoke made of a ferromagnetic material, and a coil assembly including a plurality of loops of electrically conductive wire, wherein the coil assembly is substantially surrounded by the outer yoke. The electromagnetic transducer further includes an inner yoke made of a ferromagnetic material, and a magnet. The magnet is disposed within the outer yoke such that the coil assembly surrounds the magnet. The inner yoke is disposed within the magnet, and the magnet is free to translate between the outer yoke and the inner yoke. The electromagnetic transducer further includes at least one high-reluctance zone positioned within the outer yoke and/or the inner yoke.

In another embodiment, an electromagnetic transducer includes a magnet movably disposed between an inner yoke and an outer yoke, wherein the outer yoke and/or the inner yoke comprises at least one high-reluctance zone, and a coil assembly including a plurality of loops of electrically conductive wires. The coil assembly is substantially surrounded by the outer yoke. When the magnet is displaced from a center position between the outer yoke and the inner yoke by a displacement force, magnetic energy is stored within the outer yoke and/or the inner yoke. Upon removal of the displacement force, the magnetic energy returns the magnet to the center position between the outer yoke and the inner yoke.

In yet another embodiment, an electromagnetic transducer includes a housing and a magnet movably disposed between an inner yoke and an outer yoke, wherein the outer yoke and/or the inner yoke includes at least one high-reluctance zone configured as a gap, and the outer yoke, the inner yoke, and the magnet are disposed within the housing. The electromagnetic transducer further includes a coil assembly including a plurality of loops of electrically conductive wires. The coil assembly is substantially surrounded by the outer yoke. When the magnet is displaced from a center position between the outer yoke and the inner yoke by a displacement force, magnetic energy is stored within the outer yoke and/or the inner yoke. Upon removal of the displacement force, the magnetic energy returns the magnet to the center position between the outer yoke and the inner yoke. The electromagnetic transducer further includes an actuator having a first end and a second end, wherein the first end is coupled to the housing and the second end is coupled to the outer yoke or the inner yoke. The actuator is configured to vary a width of the gap of the at least one high-reluctance zone to vary a spring rate of the electromagnetic transducer.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Referring generally to the figures, embodiments described herein are directed to self-centering electromagnetic transducers. The self-centering electromagnetic transducers described herein may be configured as actuators (e.g., self-centering linear motors that convert AC voltage to movement of a magnet/load), generators (i.e., devices convert movement of a magnet/load to AC voltage) or springs, for example. Generally, embodiments of the present disclosure comprise yoke components fabricated from a ferromagnetic material that provide a structure for a magnetic flux path, a stationary coil assembly, and one or more axially movable magnets. As described in more detail below, embodiments of the present disclosure incorporate high-reluctance zones in the structure providing the magnetic flux path to store magnetic energy, which is a function of the position of the one or more magnets in the axial direction. The storage of magnetic energy in the one or more high-reluctance zones causes the one or more magnets to return to a neutral, center position upon removal of a force that displaces the one or more magnets (e.g., the force created by current in the coil assembly). Accordingly, the self-centering electromagnetic transducers described herein do not need return springs to return the one or more magnets to the neutral position. Although the embodiments described herein do not need return springs, in some embodiments such return springs may be included. The self-centering electromagnetic transducer devices may be incorporated into cooler devices, such as Stirling cooler device, for example.

Various embodiments of self-centering electromagnetic transducers are described in detail below.

Figure 1:
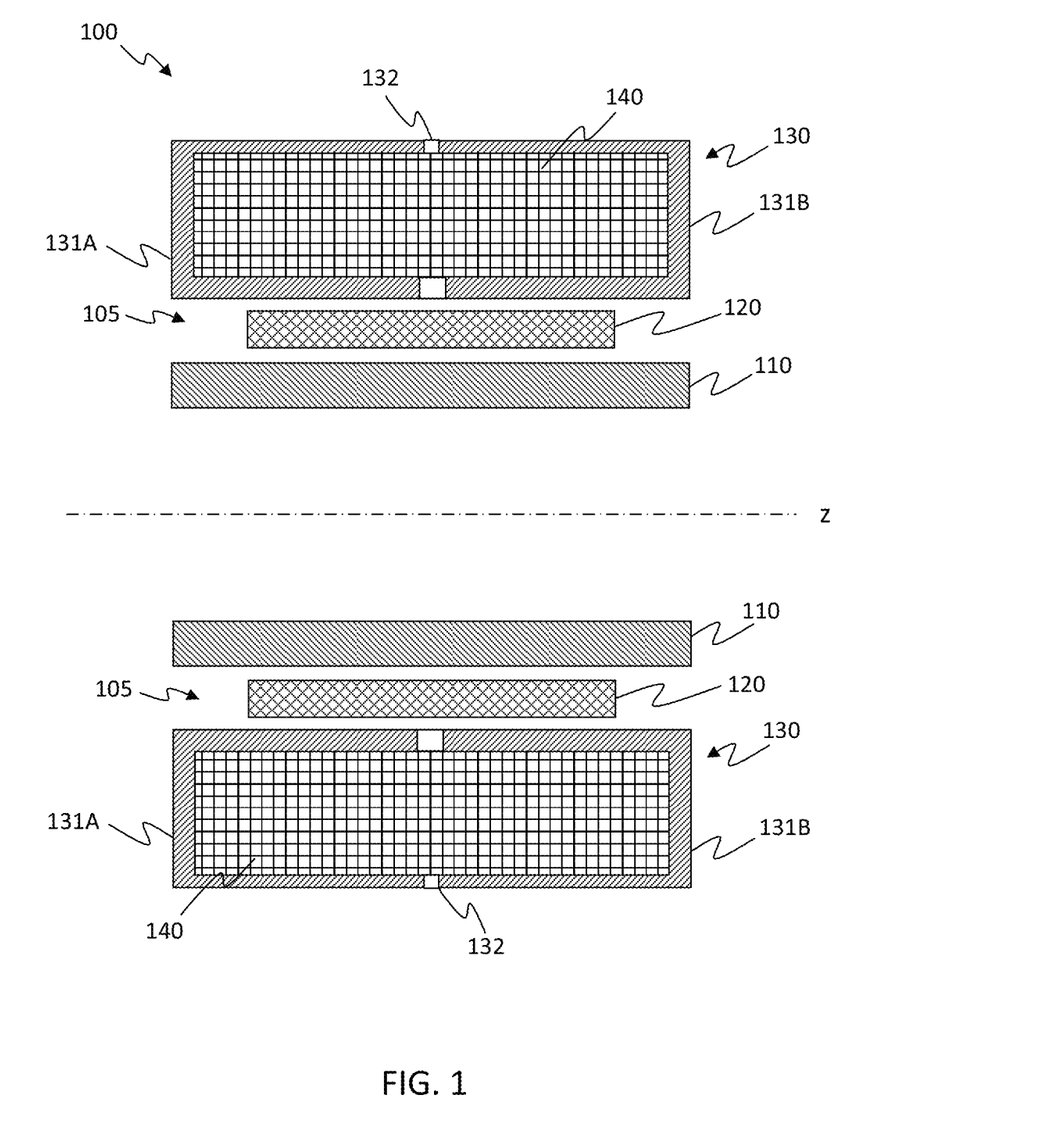
FIG. 1 schematically depicts an electromagnetic transducer in cross-section according to one or more embodiments described and illustrated herein.

Referring now to FIG. 1, an example electromagnetic transducer 100 is schematically illustrated in cross-section. The electromagnetic transducer 100 may be configured as an actuator, such as a linear motor, for example. Generally, the electromagnetic transducer comprises an inner yoke 110, a magnet 120, an outer yoke 130, and a coil assembly 140. It is noted that the aforementioned components are coaxially positioned about a centerline z in the illustrated embodiment.

The inner yoke 110 of the illustrated embodiment is cylindrically shaped, and is fabricated from a ferromagnetic material, such as iron. It should be understood that any ferromagnetic material may be utilized. The inner yoke 110 may be configured as a unitary component, or may be fabricated from multiple components. The magnet 120 in the illustrated embodiment is configured as a cylindrical permanent magnet that surrounds the inner yoke 110. The magnet 120 may be fabricated from any suitable material including, but not limited to, rare earth metals.

The outer yoke 130, which is also fabricated from a ferromagnetic material, surrounds the magnet 120 and the inner yoke 110 such that a gap 105 is present between the outer yoke 130 and the inner yoke 110. The magnet 120 is disposed within the gap 105 and is free to translate axially therein (i.e., along centerline z).

The outer yoke 130 surrounds the coil assembly 140. The coil assembly 140 comprises an electrically conductive wire (e.g., copper wire) wrapped around a core. The electrically conductive wire of the coil assembly 140 may provide any number of turns. In some embodiments, the outer yoke 130 comprises a first half 131A that is secured to a second half 131B such that the coil assembly 140 is disposed within the outer yoke 130 between the first half 131A and the second half 131B. In the illustrated embodiment, the first and second halves 131A, 131B are generally "C" shaped in cross-section. Other configurations are also possible. For example, the outer yoke 130 may only cover a portion of an inner surface of the coil assembly 140 such that a majority of the inner surface of the coil assembly 140 is exposed toward the magnet 120.

It is noted that embodiments are not limited to a cylindrical shape about a centerline z. For example, the electromagnetic transducer may have a flat design wherein the coil assembly 140 is part of a larger assembly and is symmetrical about an axis other than a centerline z.

Figure 2:
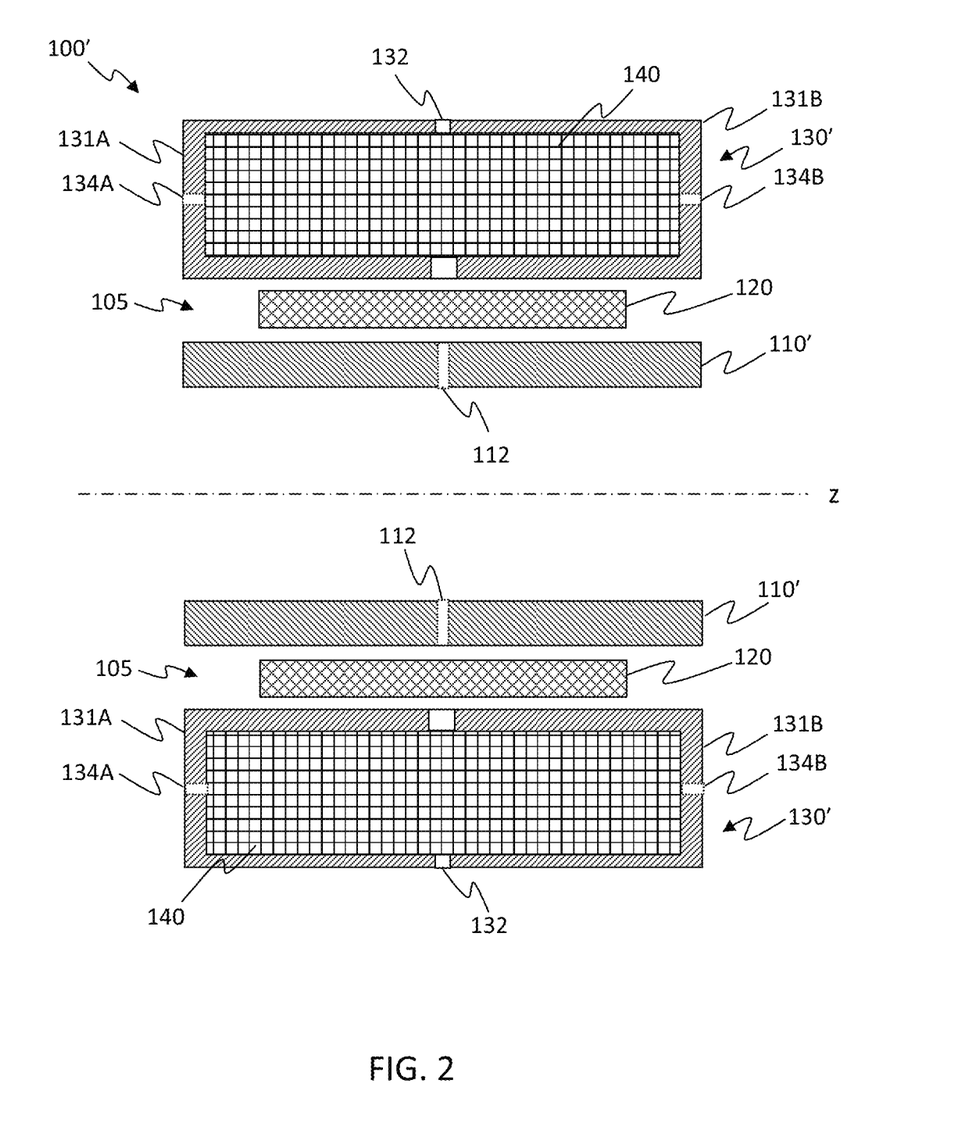
FIG. 2 schematically depicts another electromagnetic transducer in cross-section according to one or more embodiments described and illustrated herein.

The inner yoke 110 and the outer yoke 130 provide a flux loop path for magnetic flux that is generated when the magnet 120 is displaced within the gap 105 by a displacement x. The outer yoke 130 (and/or the inner yoke 110 as shown in FIG. 2) includes a high-reluctance zone 132. The high-reluctance zone 132 is a zone within the outer yoke 130 (and/or inner yoke 110), for example shaped as a gap, that is at least partially filled with a gas, non-ferromagnetic material, or a non-magnetically saturated ferromagnetic material. It is noted that the width of the high-reluctance zones depicted in the figures is exaggerated for ease of illustration. In some embodiments, the high-reluctance zone 132 is configured as a gap within the ferromagnetic material. In other embodiments, the high-reluctance zone 132 is filled with a non-ferromagnetic material, such as epoxy, aluminum, glass, ceramic, polymers, and the like. As described in more detail below, the configuration of the high-reluctance zone 132 is such that it stores magnetic energy when magnetic flux passes through the structure defined by the inner yoke 110 and the outer yoke 130.

Any number of high-reluctance zones 132 may be disposed within the inner yoke 110' and/or the outer yoke 130' that define the structure for the magnetic flux path. FIG. 2 depicts an electromagnetic transducer 100' similar to the embodiment depicted in FIG. 1 except that it includes two additional high-reluctance zones 134A, 134B in the outer yoke 130', and a high-reluctance zone 112 disposed in the inner yoke 110'. Although not illustrated, in some embodiments, one or more high-reluctance zones may be disposed in only the inner yoke 110', and no high-reluctance zones may be disposed in the outer yoke 130'.

Figure 3:
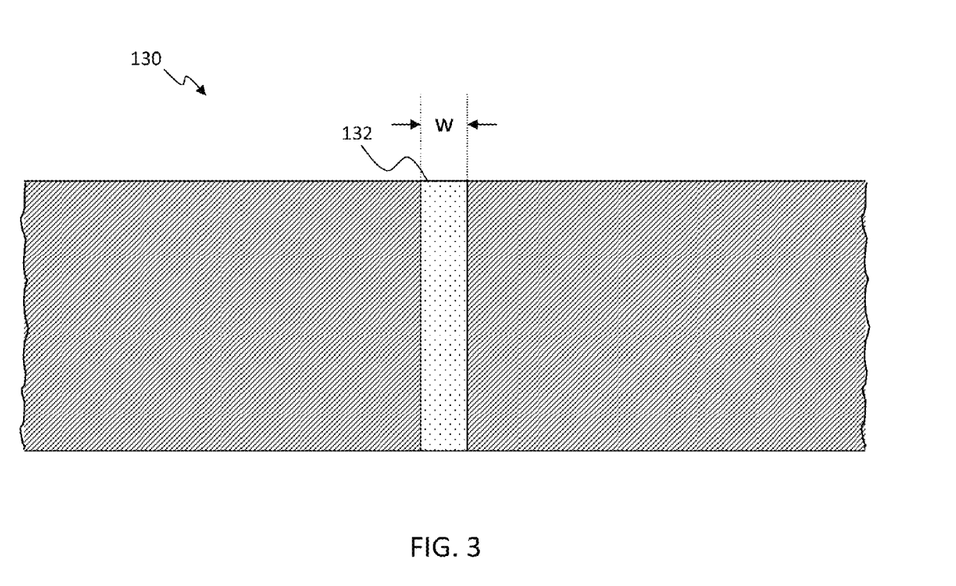
FIG. 3 schematically depicts a high-reluctance zone within an outer yoke according to one or more embodiments described and illustrated herein.

The high-reluctance zone(s) may take on various configurations. Referring now to FIG. 3, a high-reluctance zone 132 is illustrated as fully extending through a bulk of the ferromagnetic outer yoke 130. The high-reluctance zone 132 may be configured as a gap within the outer yoke 130 or, in other embodiment, may be filled with a non-ferromagnetic material as described above.

Figure 4:
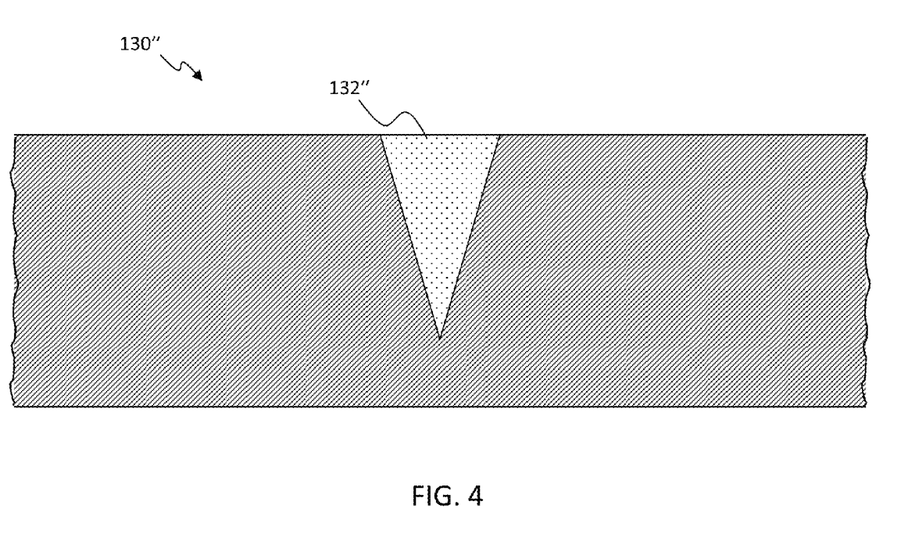
FIG. 4 schematically depicts a high-reluctance zone configured as a notch within an outer yoke according to one or more embodiments described and illustrated herein.
Figure 5:
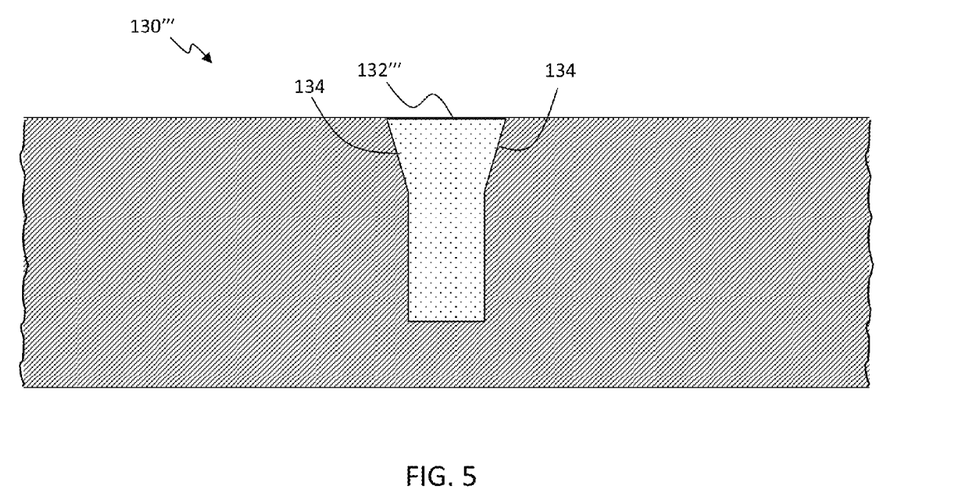
FIG. 5 schematically depicts a high-reluctance zone configured as a blind hole within an outer yoke according to one or more embodiments described and illustrated herein.

FIG. 4 depicts a high-reluctance zone 132" configured as a notch within the outer yoke 130" that does not fully extend through the bulk of the ferromagnetic material of the outer yoke. The notch may or may not be filled with a non-ferromagnetic material. Other configurations are also possible. For example, as shown in FIG. 5, the high-reluctance zone 132'" in the illustrated outer yoke 130'" may be configured as a blind hole within the ferromagnetic material. In some embodiments, the blind hole may have chamfered edges at the entrance, for example. It should be understood that embodiments are not limited to the geometric configuration of the high-reluctance zone illustrated throughout the figures.

Figure 6:
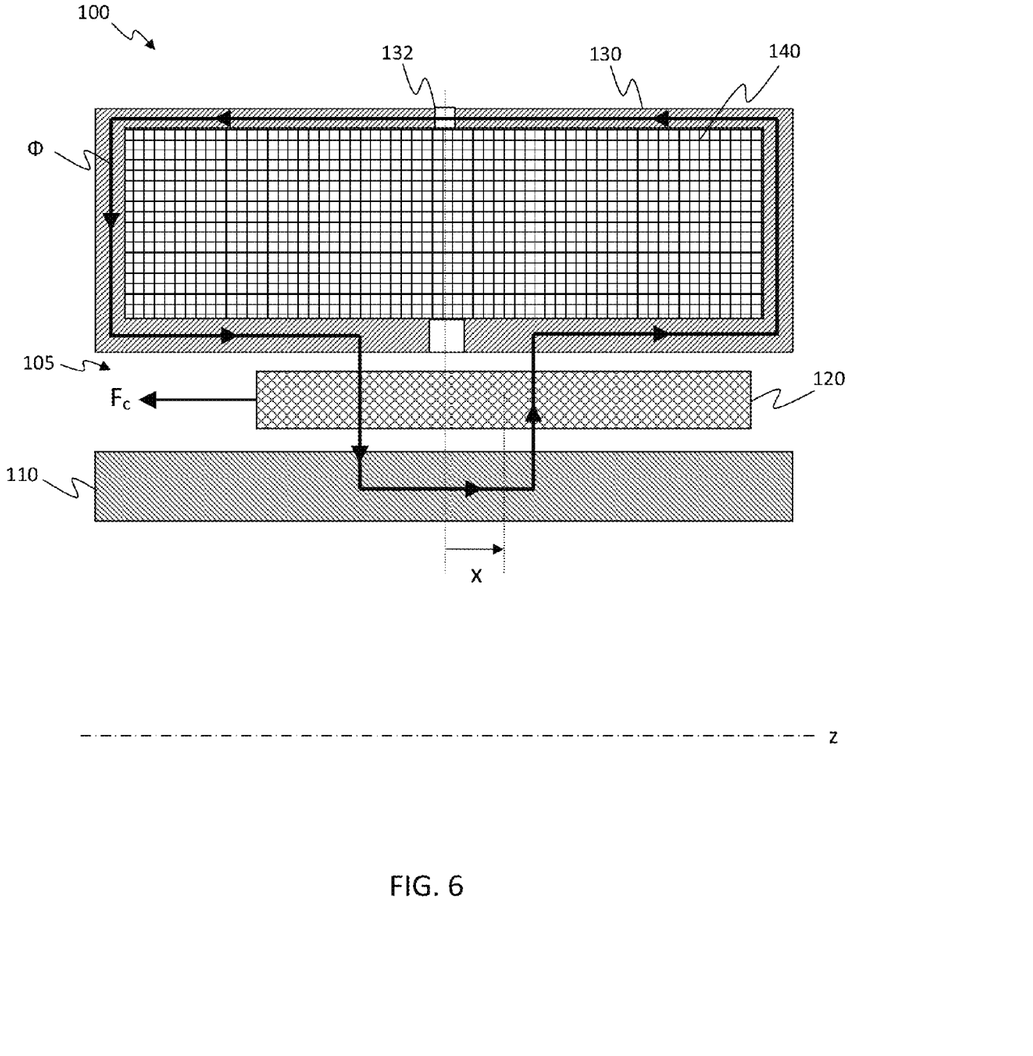
FIG. 6 schematically depicts one half of an electromagnetic transducer in cross-section illustrating a net magnetic flux path upon displacement of a magnet by x, according to one or more embodiments described and illustrated herein.

Operation of an example electromagnetic transducer 100 will now be described. Application of alternating current to the coil assembly 140 creates an electromagnetic force that causes the magnet 120 to translate back and forth along centerline z (i.e., a displacement force). The axial displacement of the magnet 120 away from its neutral position causes a magnetic flux increase. As shown in FIG. 6, displacement of the magnet 120 by x within the gap 105 creates a net magnetic flux ϕ that follows a magnetic flux path. The high-reluctance zone 132 is within the magnetic flux path. Magnetic energy is stored within the high-reluctance zone. Mechanical work is transformed into magnetic energy, and vice versa.

Figure 7:
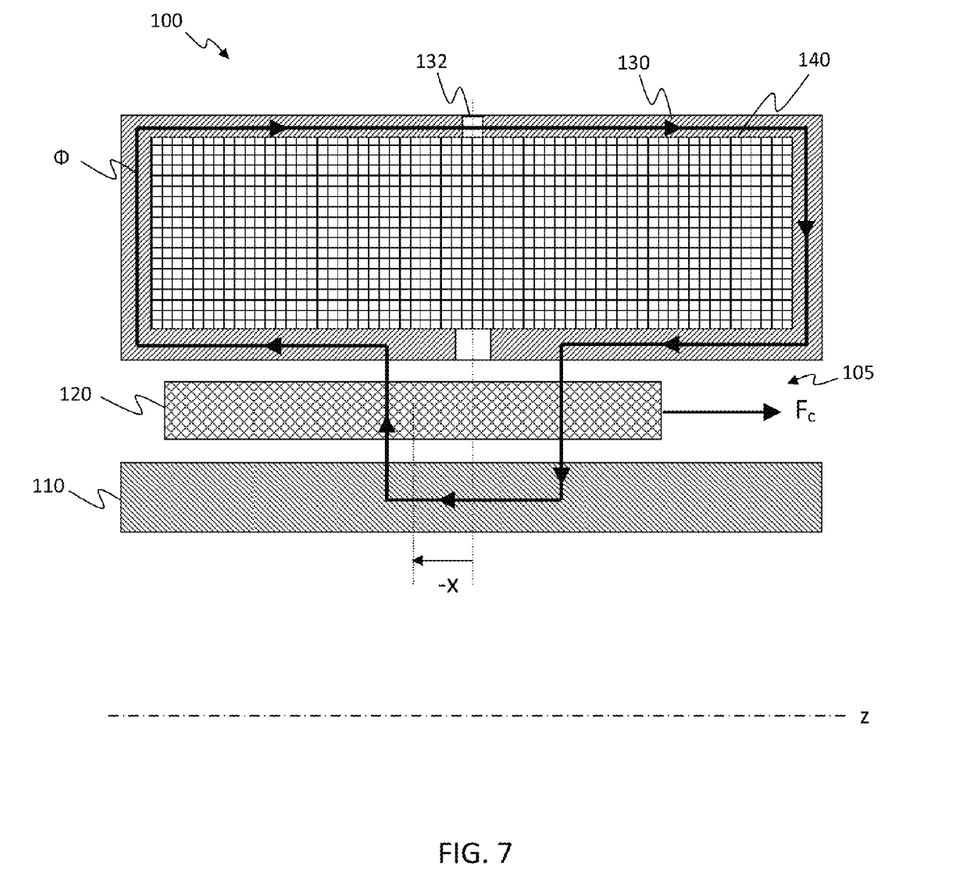
FIG. 7 schematically depicts one half of the electromagnetic transducer depicted in FIG. 6, and illustrates a net magnetic flux path upon displacement of the magnet by −x, according to one or more embodiments described and illustrated herein.

Storage of the magnetic energy in the high-reluctance zone 132 creates an axial centering force $F_c$ oriented towards the neutral position of the magnet 120 (i.e., in a direct opposite from the mechanical displacement x of the magnet 120). FIG. 7 depicts the magnet 120 as displaced by −x, which creates an axial centering force $F_c$ that is opposite from the axial centering force $F_c$ depicted in FIG. 6.

Figure 8:
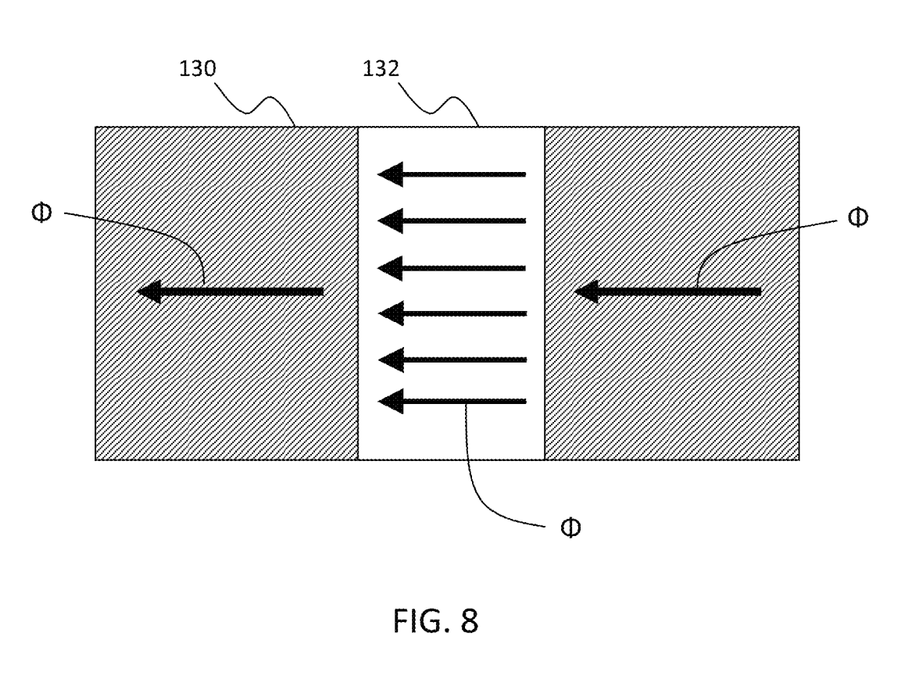
FIG. 8 schematically depicts a net magnetic flux path and magnetic flux density within a high-reluctance zone positioned within an outer yoke according to one or more embodiments described and illustrated herein.

FIG. 8 depicts a net magnetic flux ϕ orientation and storage of magnetic energy in the high-reluctance zone 132. More specifically, FIG. 8 schematically depicts the magnetic flux density B within the high-reluctance zone created by the net magnetic flux ϕ and displacement of the magnet 120.

Figure 9:
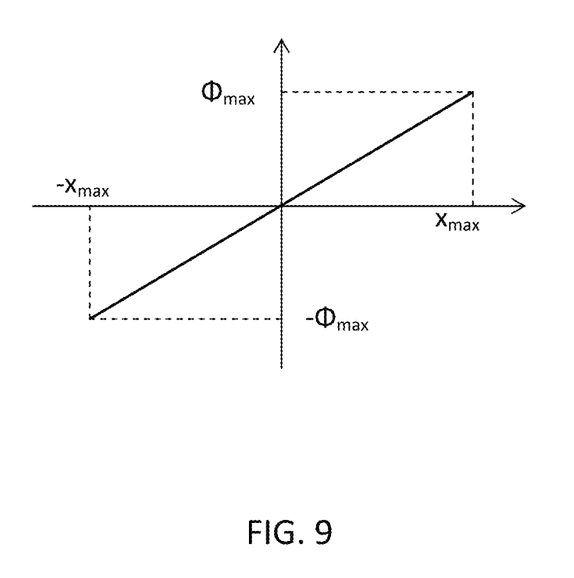
FIG. 9 graphically illustrates a relationship between magnet displacement x and net magnetic flux $\phi$ according to one or more embodiments described and illustrated herein.

FIG. 9 depicts the substantially linear relationship between axial magnet 120 displacement and net magnetic flux ϕ as shown in FIGS. 6 and 7. The net magnetic flux ϕ linearly increases with an increase in deflection of the magnet 120. The relationship between the centering force $F_c$ and the magnetic energy may be expressed by:

$$Fc = -\int H \times dB/dx \times dV, \quad \text{Eq. (1)}$$

where H is the magnetic field strength, dB is the change in magnetic flux density B intensity caused by the magnet 120 being displaced by a distance dx in a differential volume dV, and V is the volume of the high-reluctance zone. The high-reluctance zone 132 stores magnetic energy in the inner yoke 110 and/or outer yoke 130 such that the force F is great enough to return the magnet 120 to the neutral position upon removal of the displacement force that displaces the magnet 120 (e.g., the current within the coil assembly 140). Equation (2) below applies to embodiments wherein there is a plurality of high-reluctance zones in the net magnetic flux path (see FIG. 2):

$$Fc = \sum_{i=1}^{n} -\int H \times \frac{dB}{dx} \times dV, \quad \text{Eq. (2)}$$

where n is the number of high-reluctance zones.

Figure 10:
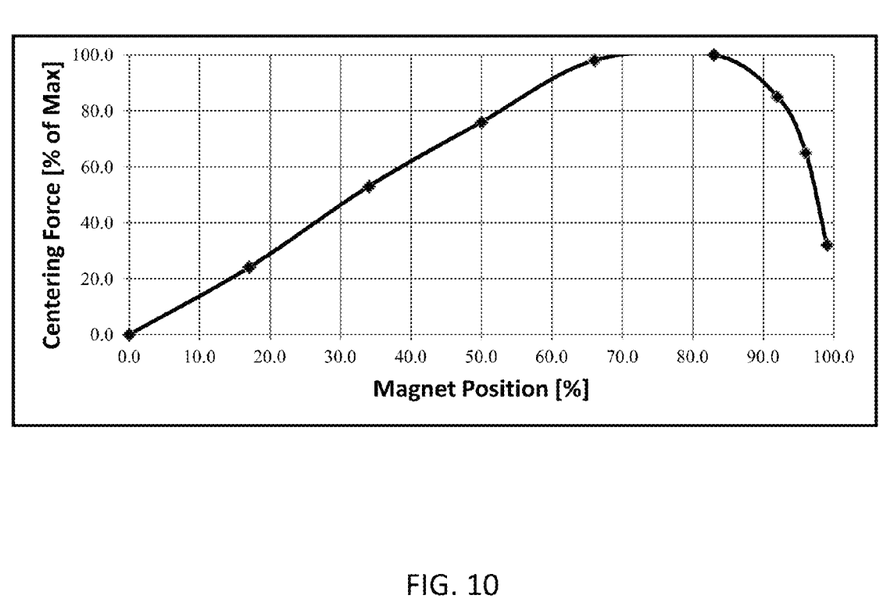
FIG. 10 graphically illustrates a relationship between magnet position and axial centering force according to one or more embodiments described and illustrated herein.

Referring now to FIG. 10, a non-limiting example force function of the axial centering force $F_c$ vs. magnet displacement x in percent of total displacement is graphically illustrated. It is noted that the example force function depicted in FIG. 10 is at zero amps in the coil assembly 140. As shown in FIG. 10, the axial centering force $F_c$ increases as the magnet 120 is displaced. The axial centering force $F_c$ decreases after reaching about 85% of the total travel of the magnet position. It should be understood that FIG. 10 is provided for illustrative purposes only, and that embodiments are not limited to the force function depicted in FIG. 10.

The width of the high-reluctance zone affects the axial centering force $F_c$ such that an increase in the width of the high-reluctance zone (i.e., the "gap size") increases the axial centering force $F_c$ and therefore the spring rate of the electromagnetic transducer. In some embodiments, the width of the one or more high-reluctance zones may be varied to tune the axial centering force $F_c$ and thereby provide the functionality of a tunable magnetic spring.

Figure 11:
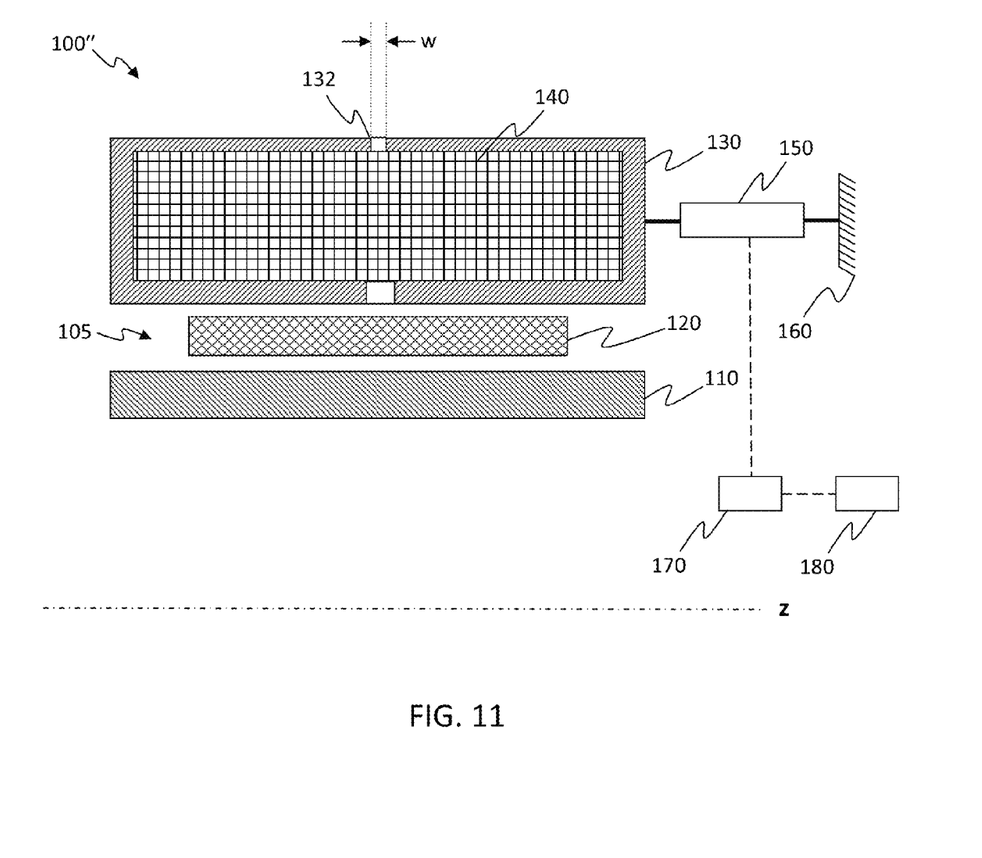
FIG. 11 schematically depicts one half of an electromagnetic transducer in cross-section, wherein the electromagnetic transducer includes an actuator that varies a width of a high-reluctance zone.

FIG. 11 depicts a tunable electromagnetic transducer 100" according to one embodiment. The tunable electromagnetic transducer 100" is similar to the electromagnetic transducer 100 depicted in FIG. 1, and further includes an actuator 150 that is coupled to the outer yoke 130 at a first end, and a support 160 (e.g., a housing of the electromagnetic transducer 100") at a second end. The high-reluctance zone 132 is configured such that its width w, and therefore its volume, may vary depending on a position of the actuator. For example, the high-reluctance zone 132 may be configured as a gap as described above. The actuator may push/pull on one or more portions of the outer yoke 130 (and/or one or more portions of the inner yoke 110 depending on where the high-reluctance zone(s) is located) to decrease/increase the width w of the high-reluctance zone 132 and thereby change the spring rate of the electromagnetic transducer 100". The actuator may be configured as any type of actuator capable of moving the outer yoke 130 and/or the inner yoke 110 such that the width w of the high-reluctance zone 132 changes. As a non-limiting example, the actuator may be a piezoelectric actuator. Additionally, it should be understood that any number of actuators may positioned about the outer yoke 130 and/or the inner yoke 110 to decrease/increase the width w of one or more high-reluctance zones 132 (e.g., a first actuator on a left side of the outer yoke and a second actuator on the right side of the outer yoke that cooperate to vary the width w of the high reluctance zone).

Figure 12:
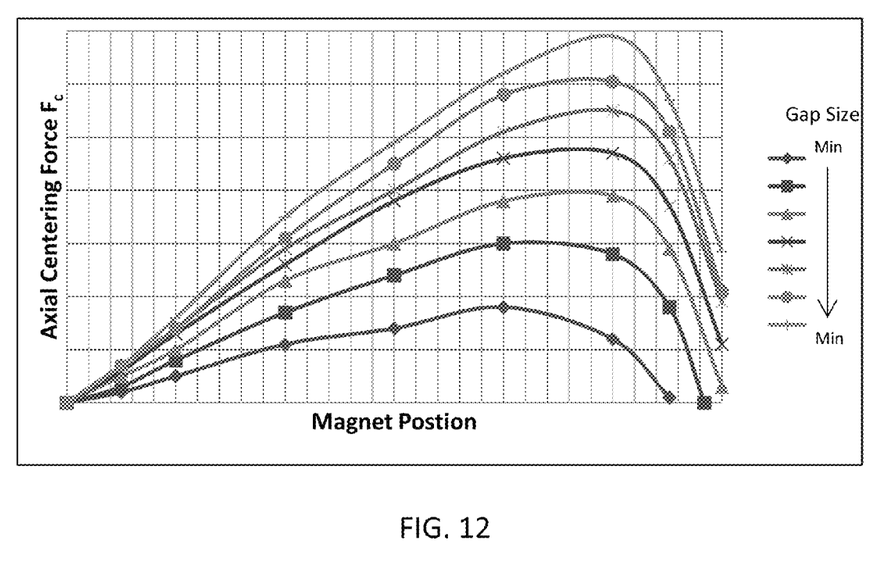
FIG. 12 graphically illustrates a relationship between magnet position and axial centering force as a function of gap size of a high-reluctance zone according to one or more embodiments described and illustrated herein.

FIG. 12 graphically illustrates the effect of gap size (i.e., high-reluctance zone 132 width w) on the axial centering force $F_c$. The slope of each curve is the spring rate. As shown in FIG. 12, the larger the gap size of the high-reluctance zone 132, the larger the axial centering force $F_c$. Accordingly, use of an actuator allows the spring rate of the electromagnetic transducer to be tuned. It is noted that if the axial centering force $F_c$ is too great (i.e., the gap size is too large), the high spring rate will adversely affect the efficiency of the electromagnetic transducer.

Referring once again to FIG. 11, in some embodiments the electromagnetic transducer 100" further includes a controller 170 that provides control signals to the actuator 150 such that the actuator 150 sets the high-reluctance zone 132 at the desired width w. As a non-limiting example, the electromagnetic transducer 100" may be tuned at the factory by use of an external or internal controller such that it has a desired spring rate. For example, in some applications, the electromagnetic transducer 100" must operate at resonance (e.g., compressors of Stirling coolers). The controller 170 and actuator 150 may cooperate such that the electromagnetic transducer is tuned for resonant operation by varying the width w of the high-reluctance zone 132. As an example and not a limitation, the width w of the high-reluctance zone 132 may be permanently set (e.g., using epoxy or other methods) at the factory following a calibration procedure. In other embodiments, the electromagnetic transducer 100" may be tune in the field.

Figure 13:
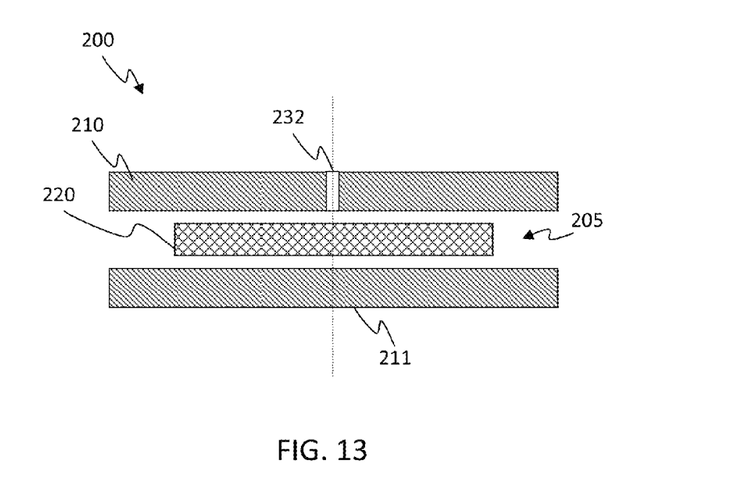
FIG. 13 schematically depicts a magnetic spring device in cross-section according to one or more embodiments described and illustrated herein.

Referring now to FIG. 13, an example magnetic spring device 200 is schematically illustrated. The example magnetic spring device 200 generally comprises a magnet 220 disposed within a gap 205 between a first ferromagnetic structure 210 and a second ferromagnetic structure 211. The magnet 220, first ferromagnetic structure 210, and the second ferromagnetic structure 211 each have a generally flat shape. The gap 205 may be provided by mounting features, such as a housing (not shown).

Similar to the electromagnetic transducer embodiments described above, the first ferromagnetic structure 210 (and/or the second ferromagnetic structure 211) has one or more high reluctance zones 232 positioned therein. The high reluctance zone 232 may have any of the shapes and configurations described above. The high reluctance zone 232 is positioned within the first ferromagnetic structure 210 and/or the second ferromagnetic structure 211 such that the magnet 220 is disposed at a neutral position when no external force is applied to the magnet 220 (e.g., x=0). As described above, a magnetic spring device 200 incorporating the one or more high reluctance zones 232 acts as a spring having a spring rate when the magnet 220 is laterally translated within the gap 205. The number and configuration of the one or more high reluctance zones 232 may be configured to achieve a desired spring rate and a desired neutral position for the magnet 220 within the gap 205.

In some embodiments, the electromagnetic transducer 100" further includes a temperature sensor 180 (internal to the electromagnetic transducer 100" or an external component) that provide a temperature signal to the controller 170 (or to the actuator 150 directly). The actuator 150 may adjust the width w of the high-reluctance zone 132 based on the temperature signal. This may be beneficial in temperature-sensitive applications, wherein resonance changes with changing temperature. The temperature sensor 180, controller 170 and actuator 150 may cooperate to dynamically adjust the width w of the high-reluctance zone 132 based on temperature so that the electromagnetic transducer 100" operates at maximum efficiency. The temperature sensor 180, the controller 170 and the actuator 150 may be discrete components, or may be provided in a single package.

It should now be understood that embodiments described herein provide for self-centering electromagnetic transducers that return the magnetic to a neutral position within the need for return springs. More specifically, embodiments include one or more high-reluctance zones within a net magnetic flux path that store magnetic energy. Upon removal of a displacement force on the magnet, the stored magnetic energy returns the magnet to the neutral position. The self-centering characteristic of the electromagnetic transducers described herein may provide for linear motors and generators that are lighter and less costly to manufacture than traditional linear motors and generators. Further, some embodiments incorporate an actuator to vary a width of one or more high-reluctance zones to tune a spring rate of the electromagnetic transducer for optimal performance.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Figure 14:
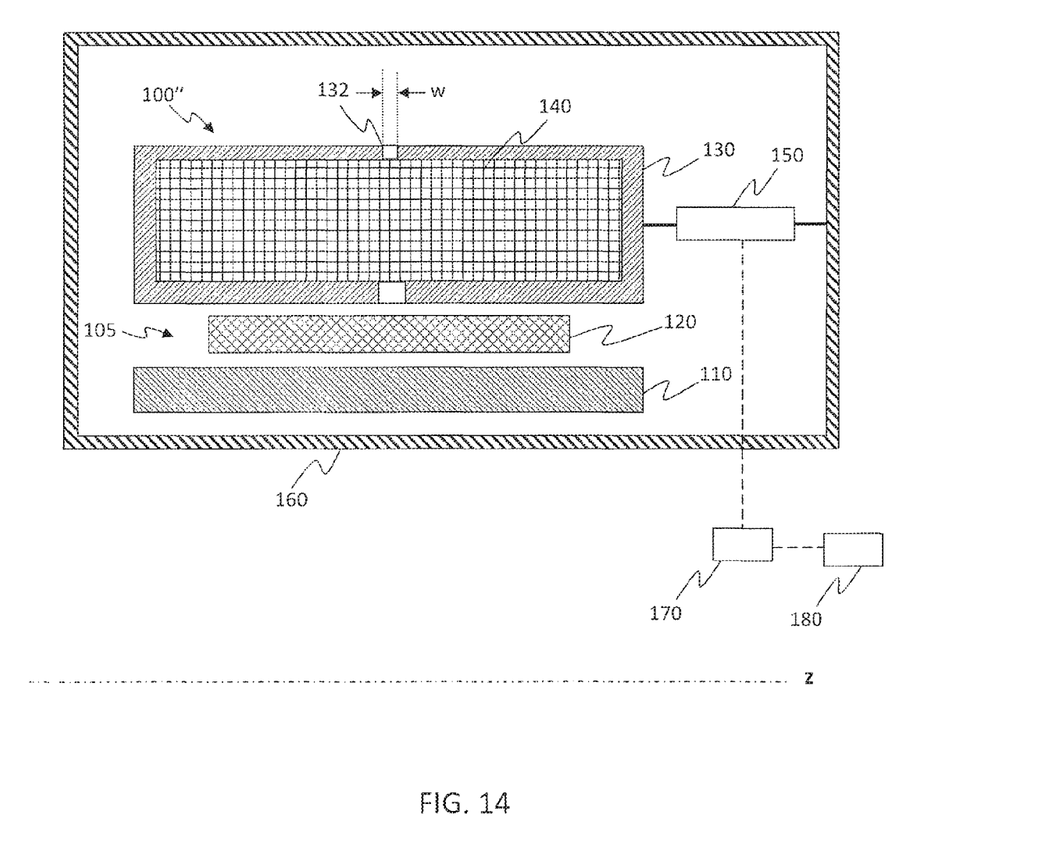
FIG. 14 schematically depicts one half of an electromagnetic transducer in cross-section, wherein the electromagnetic transducer includes a housing and an actuator that varies a width of the high-reluctance zone.

Referring now to FIG. 14, a tunable electromagnetic transducer 100" is shown. The tunable electromagnetic transducer 100" may be in accordance with any of the embodiments previously described with respect to FIG. 11. In FIG. 14, the tunable electromagnetic transducer 100" includes an actuator 150 that is coupled to an outer yoke 130 and a support 160. The support 160 in FIG. 14 is a housing of the electromagnetic transducer 100". As shown in FIG. 14, in some embodiments the housing support 160 may surround the outer yoke 130, the coil assembly 140, the magnet 120 and the inner yoke 110. The outer yoke 130, the coil assembly 140, the magnet 120 and the inner yoke 110 may be entirely disposed within the housing support 160. As discussed with reference to FIG. 11, in some embodiments the actuator 150 may be coupled to the housing support 160 at a first end and to the outer yoke 130 at a second end.

The invention claimed is:

1. An electromagnetic transducer comprising:
   an outer yoke comprising a ferromagnetic material;
   a coil assembly comprising a plurality of loops of electrically conductive wire, wherein the coil assembly is substantially surrounded by the outer yoke;
   an inner yoke comprising a ferromagnetic material;
   a magnet, wherein:
      the magnet is disposed within the outer yoke such that the coil assembly surrounds the magnet;
      the inner yoke is disposed within the magnet; and
      the magnet is free to translate between the outer yoke and the inner yoke; and
   at least one high-reluctance zone positioned within the outer yoke and/or the inner yoke, wherein the at least one high-reluctance zone is positioned within a flux path loop and the at least one high-reluctance zone is configured to store magnetic energy upon translation of the magnet between the outer yoke and the inner yoke.

2. The electromagnetic transducer of claim 1, wherein the outer yoke, the inner yoke, and the magnet are cylindrically shaped.

3. The electromagnetic transducer of claim 1, wherein more than one high-reluctance zone is positioned within the outer yoke.

4. The electromagnetic transducer of claim 1, wherein more than one high-reluctance zone is positioned within the inner yoke.

5. The electromagnetic transducer of claim 1, wherein at least one high-reluctance zone is positioned within the outer yoke and at least one high-reluctance zone is positioned within the inner yoke.

6. The electromagnetic transducer of claim 1, wherein the at least one high-reluctance zone is configured as a gap within the outer yoke or the inner yoke.

7. The electromagnetic transducer of claim 6, wherein the gap at least partially extends through a bulk of the outer yoke or the inner yoke.

8. The electromagnetic transducer of claim 1, wherein the at least one high-reluctance zone is configured as a notch in the outer yoke or the inner yoke.

9. The electromagnetic transducer of claim 1, wherein the at least one high-reluctance zone comprises a non-ferromagnetic material.

10. The electromagnetic transducer of claim 1, wherein the outer yoke comprises a first half and a second half that is coupled to the first half.

11. The electromagnetic transducer of claim 1, further comprising a housing, wherein the outer yoke, the coil assembly, the magnet and the inner yoke are disposed within the housing.

12. The electromagnetic transducer of claim 11, wherein:
the electromagnetic transducer further comprises an actuator comprising a first end and a second end, wherein the first end is coupled to the housing and the second end is coupled to the outer yoke or the inner yoke; and
the actuator is configured to vary a volume of the at least one high-reluctance zone by moving one or more portions of the inner yoke and/or the outer yoke to vary a spring rate of the electromagnetic transducer.

13. The electromagnetic transducer of claim 12, wherein
the at least one high-reluctance zone is configured as a gap extending fully through a bulk of the outer yoke and/or the inner yoke; and
the actuator is configured to vary a width of the gap of the at least high-reluctance zone to vary the volume of the at least one high-reluctance zone.

14. The electromagnetic transducer of claim 13, further comprising a temperature sensor and a controller, wherein the temperature sensor is communicatively coupled to the controller and the controller is communicatively coupled to the actuator such that the controller controls a position of the actuator based on a signal from the temperature sensor.

15. The electromagnetic transducer of claim 13, wherein the actuator is a piezoelectric actuator.

16. An electromagnetic transducer comprising:
a magnet movably disposed between an inner yoke and an outer yoke, wherein the outer yoke and/or the inner yoke comprises at least one high-reluctance zone that is positioned within a flux path loop, and the at least one high-reluctance zone is configured to store magnetic energy upon translation of the magnet between the outer yoke and the inner yoke; and
a coil assembly comprising a plurality of loops of electrically conductive wires, wherein:
the coil assembly is substantially surrounded by the outer yoke;
when the magnet is displaced from a center position between the outer yoke and the inner yoke by a force F, magnetic energy is stored within the outer yoke and/or the inner yoke; and
upon removal of the force F, the magnetic energy returns the magnet to the center position between the outer yoke and the inner yoke.

17. The electromagnetic transducer of claim 16, wherein the at least one high-reluctance zone is configured as a notch in the outer yoke or the inner yoke.

18. The electromagnetic transducer of claim 16, wherein the at least one high-reluctance zone is configured as a gap within the outer yoke or the inner yoke.

19. The electromagnetic transducer of claim 16, wherein the at least one high-reluctance zone comprises a non-ferromagnetic material.

* * * * *